(12) United States Patent
Cazeaux et al.

(10) Patent No.: US 12,397,921 B2
(45) Date of Patent: Aug. 26, 2025

(54) INTERNAL FIXED STRUCTURE FOR AN AIRCRAFT NACELLE

(71) Applicant: Airbus Operations SAS, Toulouse (FR)

(72) Inventors: Laurent Cazeaux, Toulouse (FR); Laurent Caliman, Toulouse (FR); Nicolas Charton, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/643,483

(22) Filed: Apr. 23, 2024

(65) Prior Publication Data

US 2024/0351697 A1    Oct. 24, 2024

(30) Foreign Application Priority Data

Apr. 24, 2023    (FR) ........................... 2304078

(51) Int. Cl.
    *B64D 29/02*    (2006.01)
(52) U.S. Cl.
    CPC .................... *B64D 29/02* (2013.01)
(58) Field of Classification Search
    CPC ......... B64D 29/00; B64D 29/02; B64D 29/04
    See application file for complete search history.

(56) References Cited

U.S. PATENT DOCUMENTS

| 5,101,621 A | * | 4/1992 | Mutch | B64D 29/00 |
| | | | | 428/116 |
| 2015/0041059 A1 | * | 2/2015 | Olson | B32B 37/12 |
| | | | | 156/60 |
| 2015/0136875 A1 | * | 5/2015 | Lacko | F02K 1/827 |
| | | | | 239/265.19 |
| 2015/0143796 A1 | * | 5/2015 | Lacko | F02K 1/766 |
| | | | | 60/226.2 |

FOREIGN PATENT DOCUMENTS

WO    2019155015 A1    8/2019

OTHER PUBLICATIONS

French Search Report for corresponding French Patent Application No. 2304078 dated Oct. 10, 2023.

* cited by examiner

*Primary Examiner* — Tye William Abell
(74) *Attorney, Agent, or Firm* — Greer, Burns & Crain, Ltd.

(57) ABSTRACT

An internal fixed structure for a nacelle, comprising end panels, an intermediate panel in the form of a half-cylinder between the end panels, splice plates between the intermediate panel and each end panel, wherein each splice plate is made up of a skin with an inner face fastened to the panels and at least one indentation protruding with respect to an outer face, and a pad fastened to each fastening surface of an indentation, wherein each pad of the upper splice plate bears against a surface of an engine pylon, and wherein each pad of the lower splice plate bears against a pad of a lower splice plate of another internal fixed structure.

10 Claims, 4 Drawing Sheets

INTERNAL FIXED STRUCTURE FOR AN AIRCRAFT NACELLE

CROSS-REFERENCES TO RELATED APPLICATIONS

This application claims the benefit of French Patent Application Number 2304078 filed on Apr. 24, 2023, the entire disclosure of which is incorporated herein by way of reference.

FIELD OF THE INVENTION

The present invention relates to an internal fixed structure for an aircraft nacelle, to a nacelle comprising two such structures, and to an aircraft comprising at least one such nacelle.

BACKGROUND OF THE INVENTION

A nacelle of an aircraft engine is fastened to a structure of the aircraft wing by an engine pylon and the nacelle encloses the engine of the aircraft. The nacelle conventionally comprises two internal fixed structures (also called IFS) and two outer structures (also called OS).

Each structure comprises a part forming a half-cylinder overall. The two internal structures are disposed facing one another so as to form a cylinder in which the engine is housed, and the two outer structures are disposed around the internal fixed structures. A secondary duct is thus formed between the internal fixed structures and the outer structures.

An internal fixed structure is generally made up of an upper end panel, of an intermediate panel and of a lower end panel. The end panels are planar overall, and the intermediate panel is in the form of a half-cylinder overall and is between the end panels. The end panels are fastened to the intermediate panel so as to form the internal fixed structure.

FIG. 6 shows an example of an internal fixed structure 600 from the prior art at an upper junction 601 between the upper end panel 602 and the intermediate panel 604. Each panel 602, 604 takes the form of a sandwich panel successively comprising a resistive skin 606a, a honeycomb structure 606b and a structural skin 606c.

The internal fixed structure 600 also comprises, at the junction 601, at least one shoe 610, conventionally made of metal, which is fastened a posteriori to the panels 602 and 604, for example with the aid of fasteners 612. Each shoe 610 also bears a pad 614. At the upper junction 601, the two internal fixed structures 600 appear on either side of the engine pylon 608 and each pad 614 bears against a surface of the engine pylon 608.

At a lower junction between the lower end panel and the intermediate panel 604, the two internal fixed structures 600 appear facing one another and each pad 614 of one internal fixed structure 600 bears against a pad of the other internal fixed structure 600.

Furthermore, due to the curvature at the junctions 601, the internal fixed structure 600 comprises a honeycomb structure 607 which exhibits high flexibility properties in order to adapt to said curvature.

Even if such an arrangement is satisfactory from a functional point of view, it is necessary to find a new arrangement, for example in order to eliminate the flexible honeycomb structure 607 which is relatively expensive.

SUMMARY OF THE INVENTION

An object of the present invention is to propose an internal fixed structure for an aircraft nacelle, for which the shoes are incorporated directly into a splice plate fastened to the panels.

To this end, what is proposed is an internal fixed structure for a nacelle of an aircraft comprising an engine pylon, said internal fixed structure comprising:
  an upper end panel,
  a lower end panel,
  an intermediate panel in the form of a half-cylinder and disposed between the upper end panel and the lower end panel,
  an upper splice plate between the upper end panel and the intermediate panel,
  a lower splice plate between the intermediate panel and the lower end panel, wherein each splice plate is made up of a skin with an inner face and an outer face, wherein the inner face is fastened to the intermediate panel and to the end panel considered, and wherein the skin comprises at least one indentation protruding with respect to the outer face, wherein each indentation has a fastening surface, and
  for each fastening surface, a pad fastened to said fastening surface, wherein each pad of the upper splice plate is intended to bear against a surface of the engine pylon, and wherein each pad of the lower splice plate is intended to bear against a pad of a lower splice plate of another internal fixed structure.

With such an arrangement, it is no longer necessary to install a honeycomb structure with high flexibility properties, and a honeycomb structure with standard flexibility properties is sufficient.

According to a particular embodiment, each panel is a sandwich panel successively comprising a resistive skin, a honeycomb structure and a structural skin, which are fastened to one another, wherein the inner face of each splice plate is fastened to the structural skins of the intermediate panel and of the end panel considered.

According to a particular embodiment, each panel is a sandwich panel successively comprising a resistive skin, a honeycomb structure, a structural skin, which are fastened to one another, and a closure skin shaped so as to be fastened to the structural skin and to a edge of said panel, wherein the inner face of each splice plate is fastened to the closure skins of the intermediate panel and of the end panel considered.

Advantageously, the internal fixed structure comprises a complementary skin fastened between the resistive skins of the intermediate panel and of the end panel considered, and the closure skins of the intermediate panel and of the end panel considered are common and thus form a single skin placed against the complementary skin.

Advantageously, the internal fixed structure comprises a complementary honeycomb structure fastened between the complementary skin and the closure skin/skins.

Advantageously, a edge of the intermediate panel and a edge of a considered end panel are at a distance from one another, the considered splice plate comprises stiffeners or extruded elements or corrugations disposed against the inner face of the skin of said splice plate, and each stiffener or extruded element or corrugation is positioned between the edge of the intermediate panel and the edge of said end panel.

Advantageously, each stiffener or extruded element or corrugation comprises a plate fastened to the skin of the splice plate.

Advantageously, each stiffener or extruded element or corrugation comprises a wall that is rigidly connected to the plate and extends perpendicularly with respect to the plate.

The invention also proposes a nacelle for an aircraft comprising an engine pylon, the nacelle comprising two internal fixed structures according to one of the preceding variants, wherein the two internal fixed structures face one another, in such a way that the intermediate panels form a cylinder, wherein each pad of the lower splice plate of one internal fixed structure bears against a pad of the lower splice plate of the other internal fixed structure.

The invention also proposes an aircraft comprising an engine pylon and at least one nacelle according to the preceding variant, wherein each pad of the upper splice plate of an internal fixed structure bears against a surface of the engine pylon.

BRIEF DESCRIPTION OF THE DRAWINGS

The above-mentioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
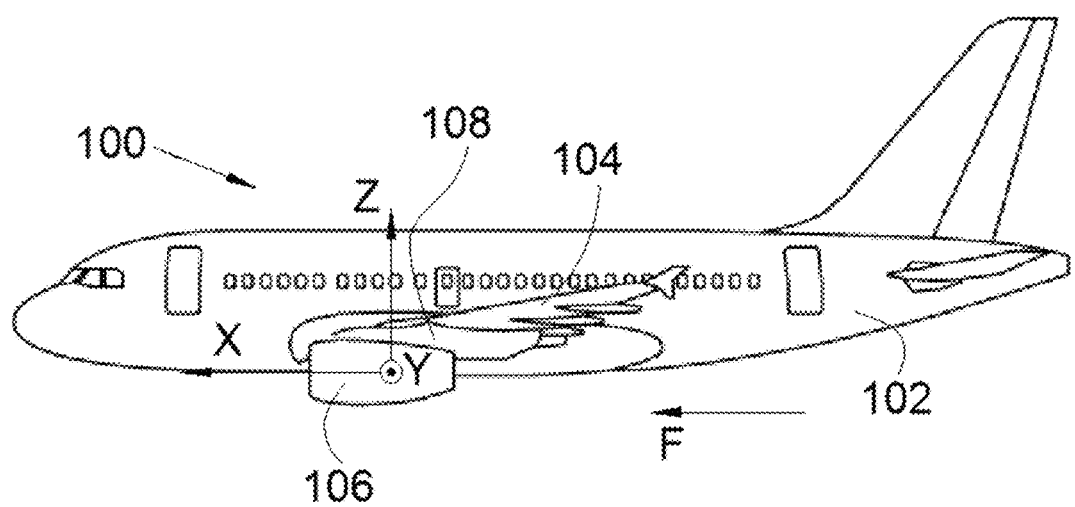
FIG. 1 is a side view of an aircraft according to the invention.

FIG. 1 shows an aircraft 100 which comprises a fuselage 102 to either side of which is fastened a wing 104 beneath which at least one nacelle 106 is fastened via an engine pylon 108. An engine is housed inside the nacelle 106.

In the following description, and by convention, X denotes the longitudinal axis of the nacelle 106 which is oriented positively in the direction of forward movement of the aircraft 100, Y denotes the transverse axis which is horizontal when the aircraft 100 is on the ground, and Z denotes the vertical axis or vertical height when the aircraft 100 is on the ground, these three directions X, Y and Z being mutually orthogonal.

In the following description, terms relating to a position are considered with reference to the direction of movement of the aircraft 100 when the turbomachine is in operation, indicated by the arrow F.

Figure 2:
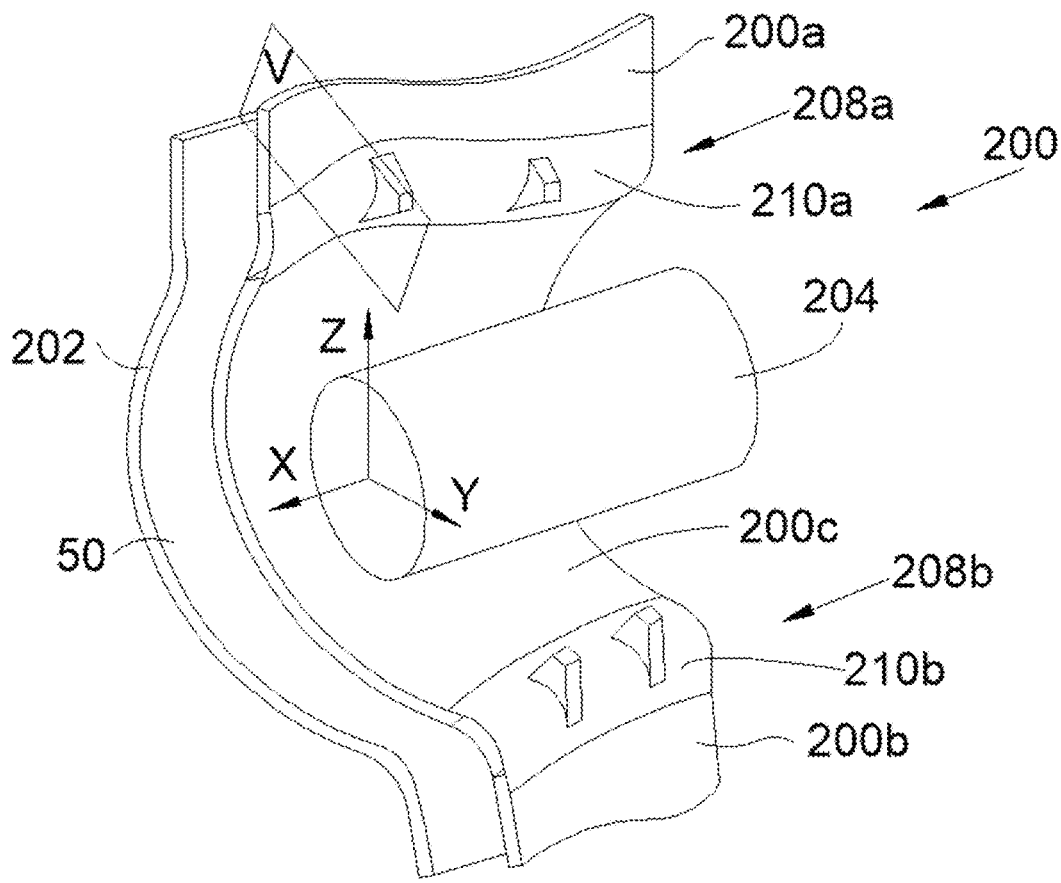
FIG. 2 is a schematic perspective representation of an internal fixed structure according to the invention.

FIG. 2 shows an internal fixed structure 200 according to the invention. As for the prior art, the nacelle 106 comprises two internal fixed structures 200 (also called IFS) and two outer structures 202 (also called OS).

Each structure 200, 202 comprises a part forming a half-cylinder overall, and the two internal fixed structures 200 are disposed facing one another in such a way that the two half-cylinders combine to form a cylinder in which the engine 204 is housed. The two outer structures 202 are disposed around the internal fixed structures 200 in such a way as to form a secondary air duct 50 between the internal fixed structures 200 and the outer structures 202.

The internal fixed structure 200 is made up of an upper end panel 200a, of an intermediate panel 200c and of a lower end panel 200b. The end panels 200a-b are planar overall, and the intermediate panel 200c forms a half-cylinder overall and is disposed and fastened between the end panels 200a-b so as to form the internal fixed structure 200. In position in the aircraft 100, the upper end panel 200a is disposed above the intermediate panel 200c and the lower end panel 200b is disposed below the intermediate panel 200c. Thus, in the nacelle 106, the two internal fixed structures 200 face one another, in such a way that the intermediate panels 200c face one another so as to form the cylinder in which the engine 204 is housed.

Figure 5:
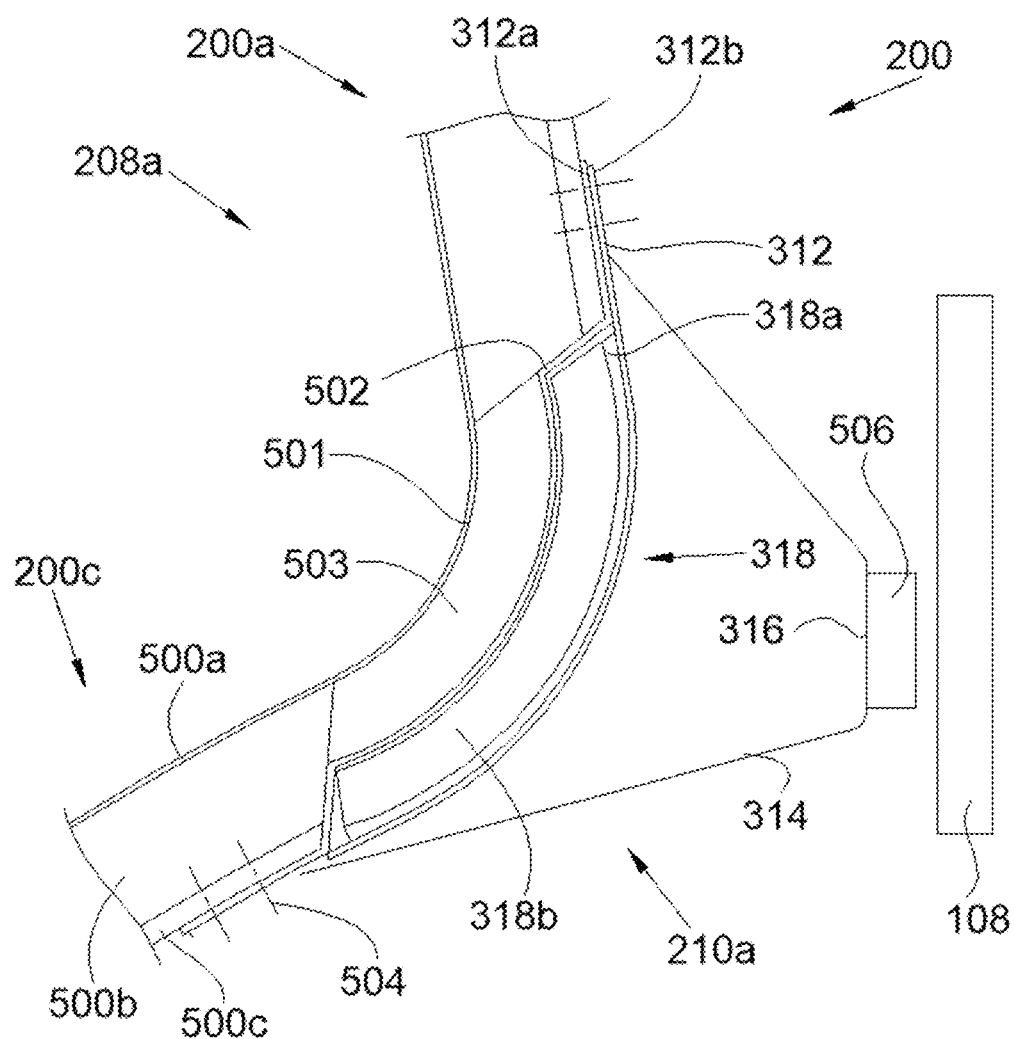
FIG. 5 is a view in section of the internal fixed structure according to the invention along plane V in FIG. 2.
Figure 6:
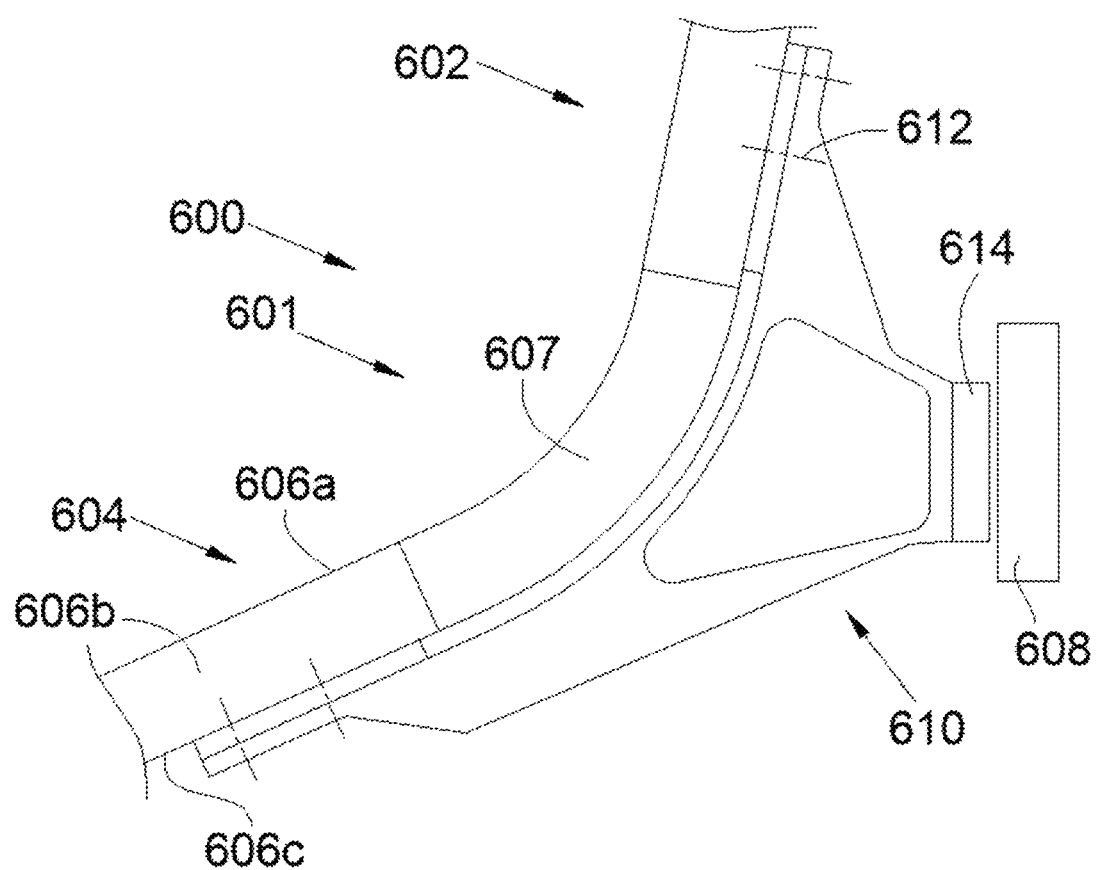
FIG. 6 is a view in section of an internal fixed structure of the prior art.

The internal fixed structure 200 has an upper junction 208a between the upper end panel 200a and the intermediate panel 200c and a lower junction 208b between the intermediate panel 200c and the lower end panel 200b. FIG. 5 shows the internal fixed structure 200 at the upper junction 208a, but the arrangement is similar at the lower junction 208b.

According to the invention, at the upper junction 208a, the internal fixed structure 200 comprises an upper splice plate 210a, and at the lower junction 208b, the internal fixed structure 200 comprises a lower splice plate 210b. Each splice plate 210a-b ensures the joining and the fastening between the intermediate panel 200c and the end panel 200a-b considered.

Figure 3:
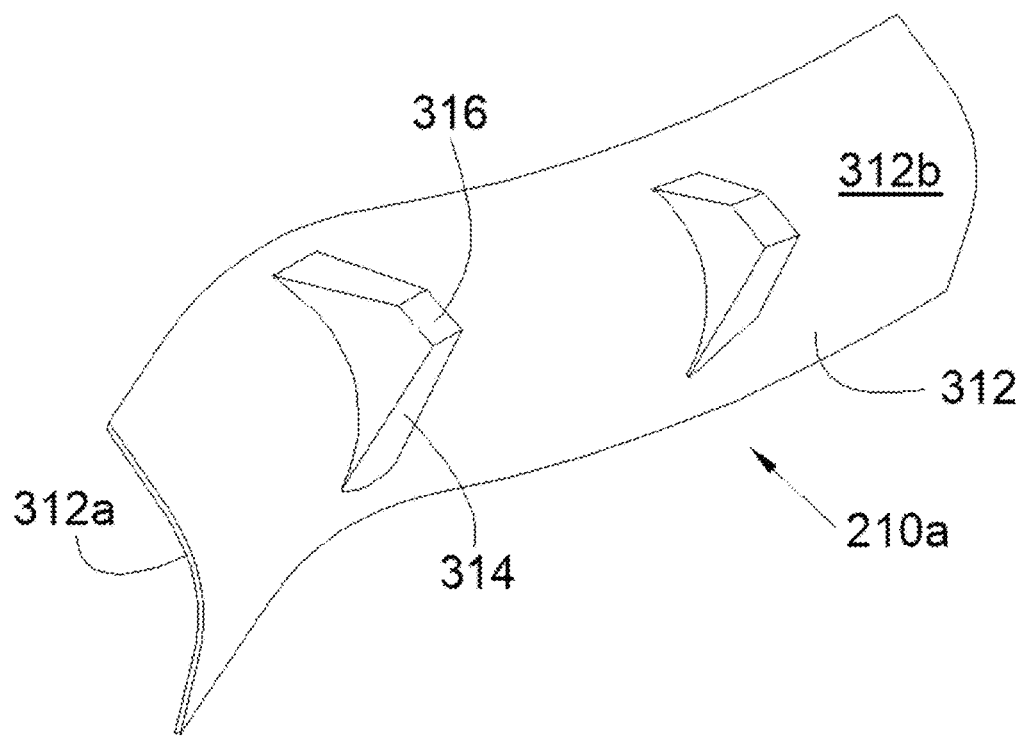
FIG. 3 is a perspective front view of a splice plate for the internal fixed structure according to the invention.
Figure 4:
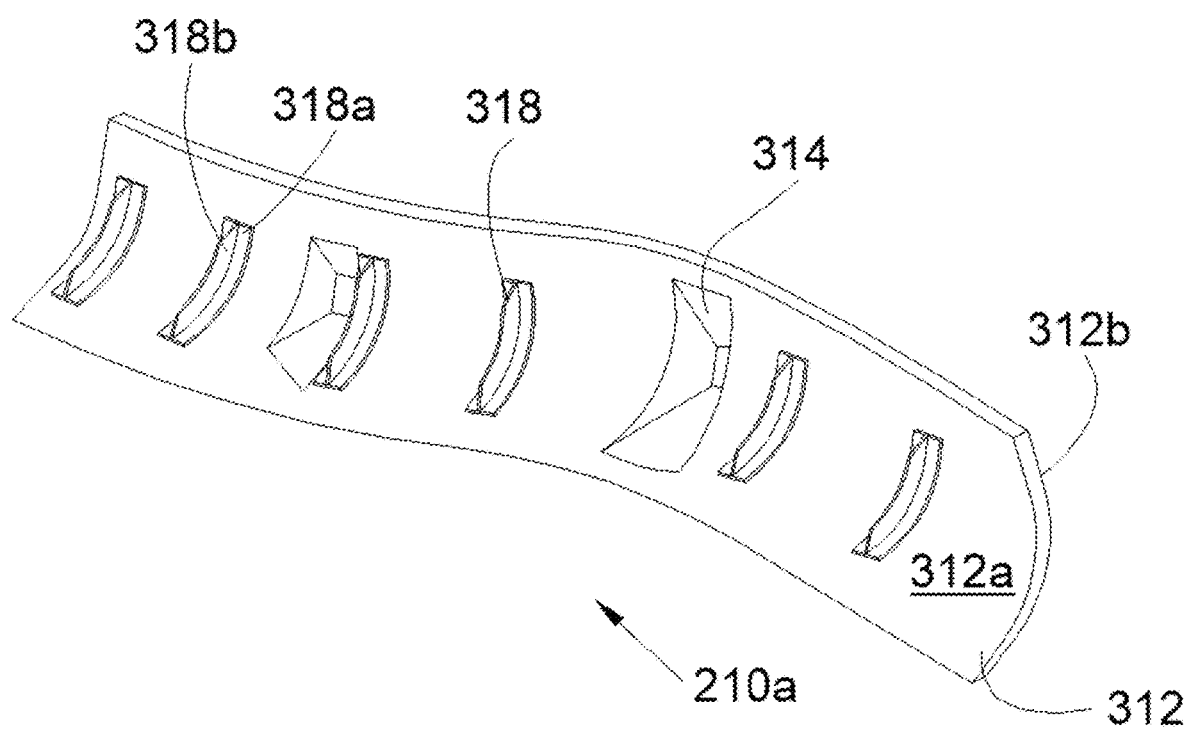
FIG. 4 is a perspective top view of the splice plate in FIG. 3.

FIGS. 3 and 4 show the upper splice plate 210a, but the principle is identical for the lower splice plate 210b. The splice plate 210a-b is made up of a skin 312 having an inner face 312a and an outer face 312b, wherein the inner face 312a is fastened to the intermediate panel 200c and to the end panel 200a-b considered. The edge of the intermediate panel 200c and the edge of the end panel 200a-b considered are at a distance from one another, and the splice plate 210a-b thus bridges the space between said edges and holds them together.

The skin 312 is thus shaped depending on the form of the internal fixed structure 200 and comprises one or more indentations 314, wherein each indentation 314 protrudes with respect to the outer face 312b. Each indentation 314 is therefore in one piece with the skin 312, thus forming a single component. Each indentation 314 thus forms a boss on the side of the outer face 312b and a recess on the side of the inner face 312a.

The fastening of the skin 312 is ensured by any suitable means, such as the installation of fasteners 504 such as blind bolts, adhesive bonding, etc.

Each indentation 314 has a fastening surface 316 to which a pad 506 is fastened.

At the upper junction 208a and therefore the upper splice plate 210a, the two internal fixed structures 200 appear on either side of the engine pylon 108 and each pad 506 of an upper splice plate 210a bears against a surface of the engine pylon 108. At the lower junction 208b and therefore the lower splice plate 210b, the two internal fixed structures 200 appear facing one another and each pad 506 of the lower splice plate 210b of one internal fixed structure 200 bears against a pad 506 of the lower splice plate 210b of the other internal fixed structure 200.

Thus, with such an arrangement, it is no longer necessary to install a flexible honeycomb structure, resulting in financial gain. The incorporation of the indentations into the splice plate makes it possible to obtain a single component which can be easily installed, instead of having several such components in the case of the prior art.

Each splice plate 210a-b can be produced from any suitable materials such as metal (aluminum alloys, steel), thermosetting or thermoplastic composite, and by any suitable methods such as by stamping, pressing, molding, machining or others.

In the embodiment of the invention presented in FIG. 5, each panel 200a-c takes the form of a sandwich panel successively comprising a resistive skin 500a, a honeycomb structure 500b and a structural skin 500c which are fastened to one another.

The structural skin 500c and the honeycomb structure 500b ensure the rigidity of the panel 200a-c and ensure that forces passing through the panel 200a-c are reacted.

The resistive skin 500a is pierced with holes which open out into the honeycomb structure 500b in order to absorb acoustic waves. The resistive skin 500a is disposed towards the secondary air duct 50 and the structural skin 500c is oriented towards the engine 204. The honeycomb structure 500b is made up of open cells which extend between the resistive skin 500a and the structural skin 500c.

In one embodiment of the invention that is not shown, the inner face 312a of each splice plate 210a-b is fastened to the structural skins 500c of the intermediate panel 200c and of the end panel 200a-b considered.

In the embodiment of the invention presented in FIG. 5, each panel 200a-c also comprises a closure skin 502 which is shaped so as to be fastened to the structural skin 500c of said panel 200a-c and to the edge of said panel 200a-c in order to close the honeycomb structure 500b. In this embodiment of the invention, the inner face 312a of each splice plate 210a-b is fastened to the closure skins 502 of the intermediate panel 200c and of the end panel 200a-b considered.

Furthermore, in the embodiment of the invention presented in FIG. 5, a complementary skin 501 is fastened between the resistive skins 500a of the intermediate panel 200c and of the end panel 200a-b, forming the junction 208a-b considered. The closure skins 502 of the intermediate panel 200c and of the end panel 200a-b considered are common and thus form a single skin which is placed against the complementary skin 501.

In the embodiment of the invention presented in FIG. 5, a complementary honeycomb structure 503 is fastened between the complementary skin 501 and the closure skin/skins 502.

To adjust the rigidity of the skin 312 of the splice plates 210a-b, stiffeners 318 or extruded elements or corrugations are disposed against the inner face 312a. In the case of stiffeners 318, the latter are fastened to the inner face 312a. Each stiffener 318 or extruded element or corrugation is positioned in the space between the edge of the intermediate panel 200c and the edge of the end panel 200a-b considered.

In the embodiment of the invention presented in FIG. 5, each stiffener 318 is thus disposed between the skin 312 of the splice plate 210a-b and the closure skin 502 between the intermediate panel 200c and the end panel 200a-b.

According to the method implemented to produce the splice plate 210a-b, each stiffener 318 is added by overmolding, mechanical connection, welding, etc.

Each stiffener 318 or extruded element or corrugation in this case comprises a plate 318a which is fastened to the skin 312 of the splice plate 210a-b and is curved in this case.

Depending on the constraints, each stiffener 318 or extruded element or corrugation may also comprise a wall 318b that is rigidly connected to the plate 318a and extends perpendicularly with respect to the plate 318a.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An internal fixed structure for a nacelle of an aircraft comprising an engine pylon, said internal fixed structure comprising:
    an upper end panel,
    a lower end panel,
    an intermediate panel in a form of a half-cylinder and disposed between the upper end panel and the lower end panel,
    an upper splice plate between the upper end panel and the intermediate panel,
    a lower splice plate between the intermediate panel and the lower end panel, wherein each splice plate is made up of a skin with an inner face and an outer face, wherein the inner face is fastened to the intermediate panel and to the respective end panel, and wherein each skin comprises at least one indentation protruding with respect to the outer face, wherein each indentation has a fastening surface, and
    for each fastening surface, a pad fastened to said fastening surface, wherein each pad of the upper splice plate is configured to bear against a surface of the engine pylon, and wherein each pad of the lower splice plate is configured to bear against a pad of a lower splice plate of another internal fixed structure.

2. The internal fixed structure according to claim 1, wherein each panel is a sandwich panel successively comprising a resistive skin, a honeycomb structure and a structural skin, which are fastened to one another, wherein the inner face of each splice plate is fastened to the structural skins of the intermediate panel and of the respective end panel.

3. The internal fixed structure according to claim 1, wherein each panel is a sandwich panel successively comprising a resistive skin, a honeycomb structure, a structural skin, which are fastened to one another, and a closure skin shaped so as to be fastened to the structural skin and to a edge of said panel, wherein the inner face of each splice plate is fastened to the closure skins of the intermediate panel and of the respective end panel considered.

4. The internal fixed structure according to claim 3, further comprising:
    a complementary skin fastened between the resistive skins of the intermediate panel and of the respective end panel,
    wherein the closure skins of the intermediate panel and of the receptive end panel are common and form a single skin placed against the complementary skin.

5. The internal fixed structure according to claim 4, further comprising:

a complementary honeycomb structure fastened between the complementary skin and a closure skin.

6. The internal fixed structure according to claim 1, wherein an edge of the intermediate panel and an edge of a respective end panel are at a distance from one another,
   wherein the respective splice plate comprises stiffeners or extruded elements or corrugations disposed against the inner face of the skin of the respective splice plate, and
   wherein the stiffener or extruded element or corrugation is positioned between the edge of the intermediate panel and the edge of said end panel.

7. The internal fixed structure according to claim 6, wherein each stiffener or extruded element or corrugation comprises a plate fastened to the skin of the splice plate.

8. The internal fixed structure according to claim 7, wherein each stiffener or extruded element or corrugation comprises a wall that is rigidly connected to the plate and extends perpendicularly with respect to the plate.

9. A nacelle for an aircraft comprising:

an engine pylon, and two internal fixed structures according to claim 1, wherein the two internal fixed structures face one another, in such a way that the intermediate panels form a cylinder, wherein each pad of the lower splice plate of one of the two internal fixed structures bears against a pad of the lower splice plate of the other of the two internal fixed structures.

10. An aircraft comprising:

an engine pylon and the nacelle according to claim 9, wherein each pad of the upper splice plate of the two internal fixed structures bears against a surface of the engine pylon.

* * * * *